Patented June 6, 1950

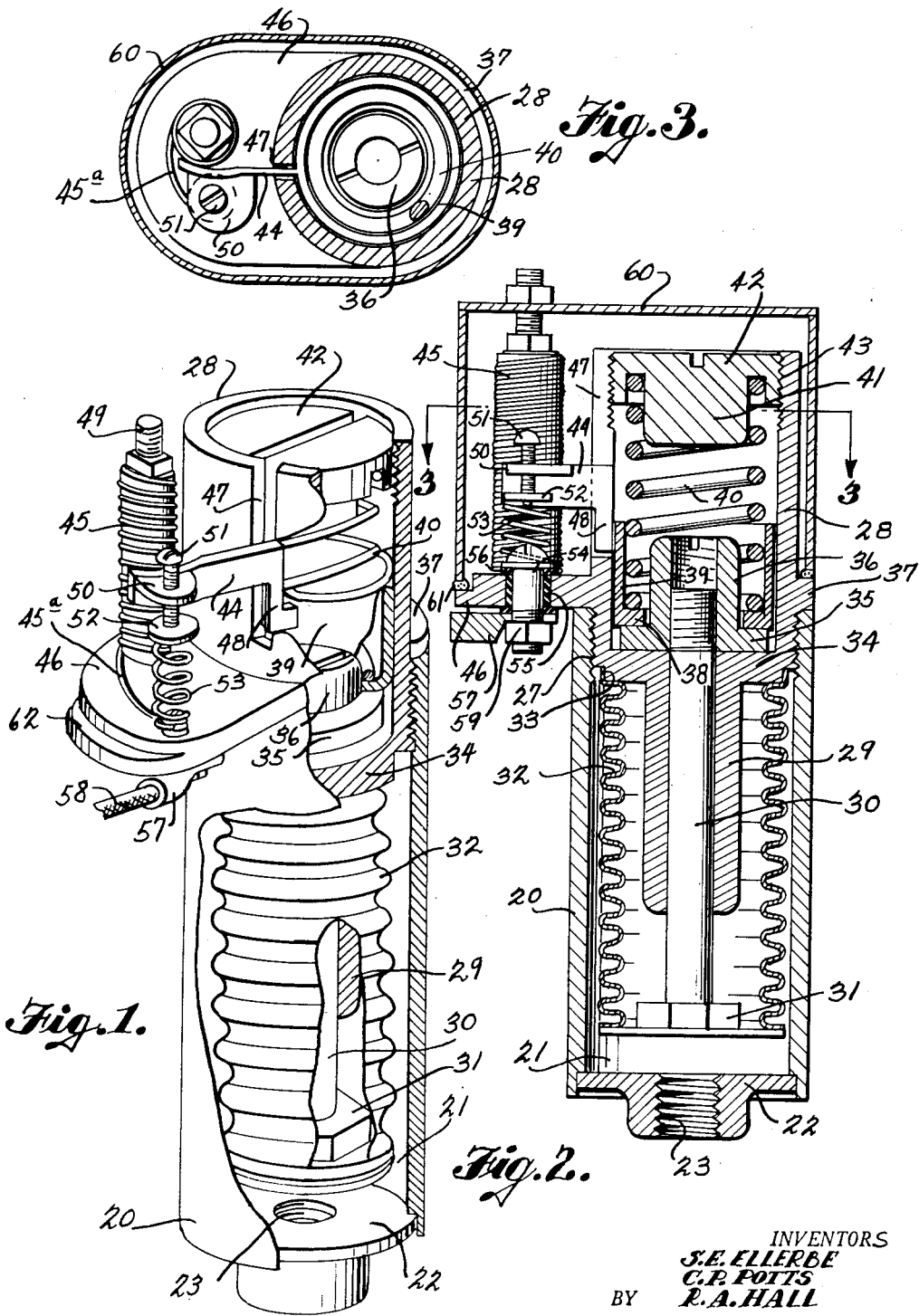

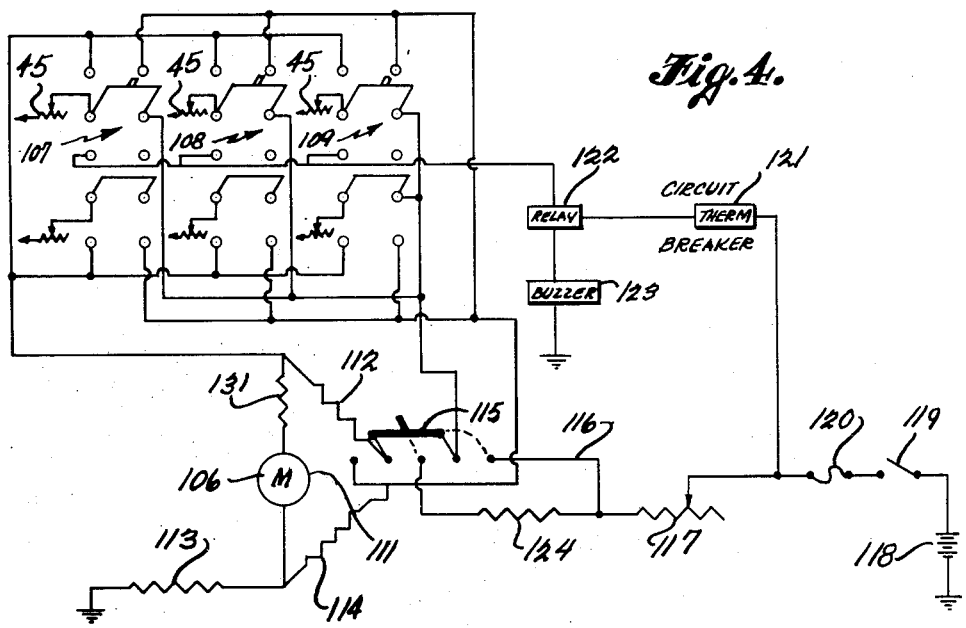
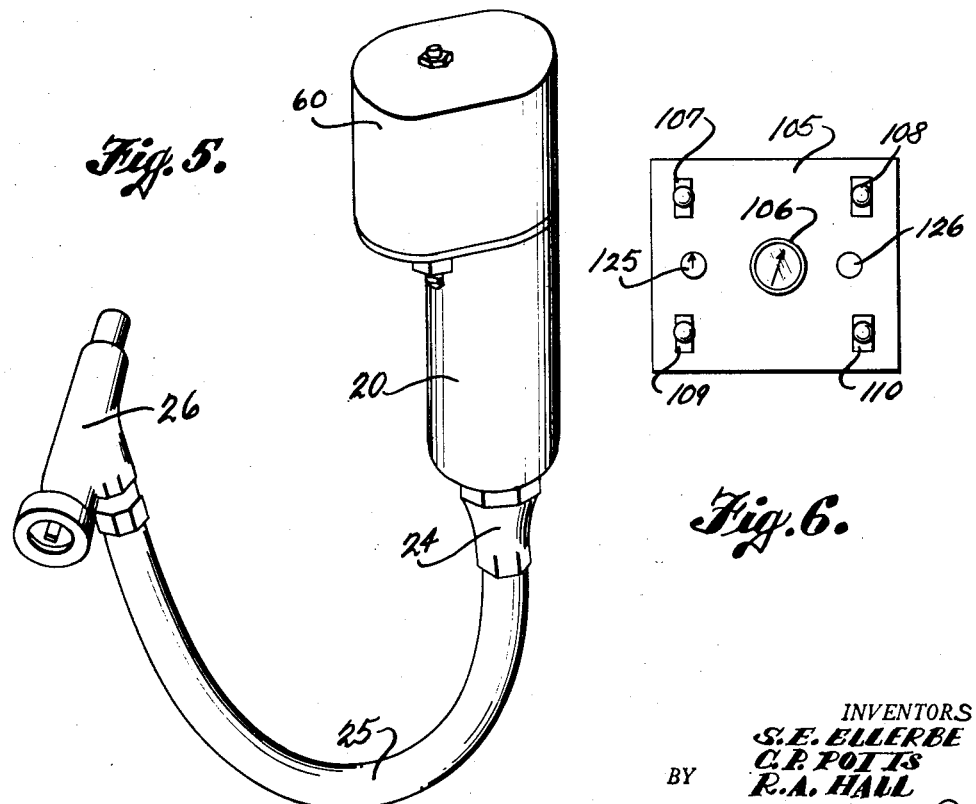

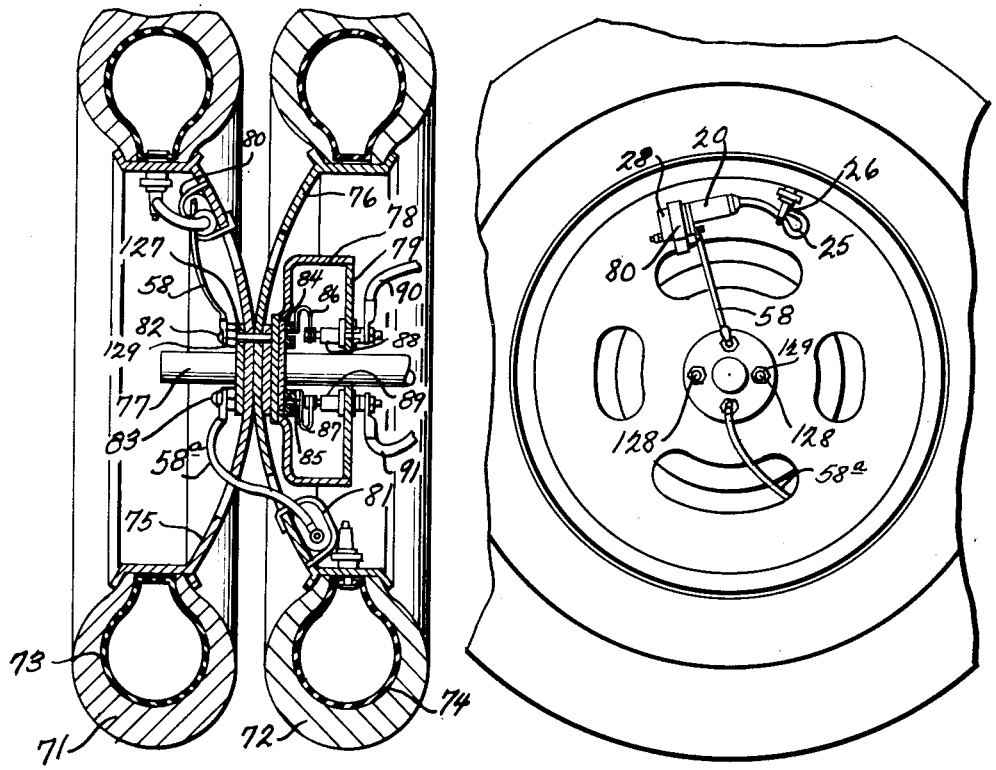

2,510,785

UNITED STATES PATENT OFFICE 2,510,785

ELECTRIC PRESSURE DEVICE

Clarence Poe Potts, Macon, Ga., Stephen Edward Ellerbe, Dothan, Ala., and Roland Avery Hall, Chamblee, Ga., assignors to Safety Tire Gauge, Inc., Atlanta, Ga., a corporation of Georgia Application April 14, 1948, Serial No. 21,066

3 Claims. (Cl. 201—48)

The present invention relates to improvements in electric pressure device and more particularly relates to certain improvements over prior Patent 2,230,906, granted February 4, 1941, to C. P. Potts for Tire pressure indicator.

An object of the present invention is to provide a pressure indicator and safety alarm on the dash or instrument board of a passenger or truck motor vehicle coupled by electric circuit arrangements to sending units on each of the vehicle wheels which are sensitive to the several tire pressures with the end in view of initially announcing by audible or visual signal, or both, to the vehicle operator that a tire has dropped below safe operating pressure and in the second place to enable the operator to ascertain precisely just which tire of a multi-wheel vehicle has dropped beneath the minimum pressure required for safe operation of the vehicle whereby such tire may receive the necessary remedial treatment.

Another object of the invention is to provide a remote pressure indicator and safety alarm wherein provision is made for automatically restoring the circuit to a normally inoperative condition after being momentarily actuated due to imperfect road conditions or other causes not connected with tire failure.

A further object of the invention is to provide an improved remote pressure indicator and safety alarm in which a single indicating guage is enabled to reflect pressure conditions in all of the tires by selective switch and circuit arrangements which do away with the necessity of employing a plurality of metering instruments which due to limited space conditions prohibit the employment of a plurality of instruments, one for each tire.

The invention also has for further objects to provide for intermittent, rather than continuous, signaling impulse effects, to provide a sender unit mounted in conjunction with each tire which is applicable to, and removable from, the wheel and tire without involving any loss of pressure and to provide a novel form of sender unit which is economical in manufacture and efficient in use.

A still further object of the present invention is to provide a system of circuit balance whereby the circuit can be balanced to a specific voltage value before checking air pressure in the various tires maintaining the accuracy of the mechanism at the same level for its entire life.

With the foregoing and other objects in view, the invention will be more fully described hereinafter and more particularly pointed out in the appended claims.

In the drawings, in which like parts are denoted by the same reference characters throughout the several views:

Figure 1 is a fragmentary perspective view showing a form of sender unit employed in connection with the present invention.

Figure 2 is a longitudinal central vertical section taken through the same.

Figure 3 is a horizontal section taken on the line 3—3 in Figure 2.

Figure 4 is a circuit diagram showing one form of circuit arrangement that may be employed.

Figure 5 is a perspective view of the sender unit and attaching assembly.

Figure 6 is a plan view showing a suggested form of panel arrangement for the dash or instrument board of the vehicle.

Figure 7 is a transverse section taken through dual rear tires of a truck or other vehicle showing the application of the invention thereto.

Figure 8 is a fragmentary side elevational view taken from the left end of Figure 7.

Figure 9 is a fragmentary vertical section through the front steering knuckles of a vehicle chassis showing a form of application of the transmitter assembly, and Figure 10 is a longitudinal section through a conventional valve stem and shows the sender attaching device thereto.

Referring more particularly to Figures 1 to 3, which illustrate a preferred form of sender unit, 20 indicates an outer pressure casing housing a pressure chamber 21, closed at its lower end by a base 22 having an internally threaded boss 23 for connection to a nipple 24, shown in Figure 5, such nipple being on the end of a flexible hose or tube 25 by which the pressure chamber 21 is placed in communication with the internal air space of the vehicle tire through a sender attaching device 26 shown in Figures 5 and 10 and more particularly described hereinafter.

The upper end of the casing 20 is internally screw threaded as indicated at 27 for the attachment thereto of a pressure transmitter body 28. The attachment of the transmitter body 28 to the casing 20 may or may not be accomplished by screw threading, as in production this may be a soldered or otherwise joined connection. This pressure body is hollow and is made of differential diameters both internally and externally. The lower portion of the body constitutes an elongated guide bearing 29 through which reciprocates a plunger rod 30 carrying upon its lower end a pressure receiving head 31 which in its lowermost position is spaced substantially above the base 22. A cylindrical or other metallic bellows 32 is affixed at its lower end to outer marginal portions of the pressure receiving head 31 and at its upper end to a reduced shoulder 33 of the pressure transmitter body 28. The bellows 32 is smaller in diameter than the internal diameter of the casing 20 in order to allow free play and the desired clearance. The bellows 32 forms an effective air seal to prevent leakage of the tire pressure air from the device and to confine the effective air pressure thrust to the lower exposed surface area of the pressure receiving head 31.

Between the pressure transmitter body 28 and its lower reduced guide bearing 29 is a diaphragm or septum 34 which provides not only the shoulder 33 but also an internal seat and stop for the lower basal flange 35 of a plunger head 36 screw threaded or otherwise removably affixed adjustably or, if desired, secured as by welding or soldering upon the upper end of the plunger rod 30.

Spaced above the diaphragm 34 and projecting externally of the pressure transmitter body 28 is a flange 37 adapted to seat upon the upper end of the casing 20 to limit the downward movement of the pressure transmitter body 28 into the casing 20. The external portion of the pressure transmitter body 28 between the diaphragm 34 and the flange 37 is screw threaded to take into the threads 27 in the upper end of the casing 20.

The plunger head flange 35 receives thereon the base 38 of a spring cup 39. The base 38 has an opening to permit the cup to slide down freely over the upper portion of the plunger head 36 so as to rest upon the flange 35. The external wall 39 of the cup is spaced from the adjacent wall of the plunger head 36 so as to receive therein a coil spring 40 of a suitable number of convolutions. The upper end of this helix 40 is received about a stud 41 projecting down from a spring adjusting screw threaded cap 42 which is threadedly and adjustably engaged with screw threads 43 made internally in the upper open end of the pressure transmitter body 28. By rotating the screw cap 42 in one or the other direction the load of the spring 40 may be nicely adjusted in relation to the effective pressure imposed upon the plunger head 35 and the plunger rod 30. In other words the load of this spring counters the tire pressure exerted against the lower plunger head 31.

The spring cup 39 carries a brush arm 44 adapted to wipe across the exposed windings of a resistor 45. This resistor is carried upon a lateral extension shelf 46 projecting laterally from the pressure transmitter body 28 and conveniently made integral therewith in line with the external flange 37 so that the shelf obtains immediate support from the upper end of the casing 20.

In the single embodiment of the sender unit as shown in Figure 1, the pressure transmitter body 28 is a cylinder which is provided with a vertically elongated slot 47 through which an elbow 48 of the brush arm 44 moves slidably up and down in accompaniment to the action of the brush in wiping over the coils of the resistor 45.

The resistor 45 may be conveniently carried by a bolt 49 passing through the shelf or platform 46 and affixed thereto by nuts or in any suitable manner. The brush arm 44 carries a lug 50 having a screw threaded perforation therethrough for threadedly and adjustably engaging an adjusting screw 51. A contact disc 52 carried by the upper end of a coil shunting spring 53 is adapted to make and break circuit with the lower end of the adjusting screw 51 dependent upon the longitudinal position of the brush arm 44 as more fully described hereinafter.

The lower end of the coil shunting spring 53 is secured to a binding post 54 insulated from the shelf or platform 46 by an insulating bushing 55 and insulating washer 56. The lower end of the binding post 54 is adapted to receive a terminal lug 57 of a transmitting cable 58. A nut 59 holds the terminal lug upon the binding post. An inverted elliptical cup shaped cover 60 may be employed to house the resistor and assembly and to protect same from oil, dirt and the elements. The lower edge of this cover seats removably upon a sealing gasket 61 carried on a down stepped shoulder 62 of the platform 46. The cover at the other side may fit upon a gasket carried by the flange 37.

Referring more particularly to Figures 5 and 10, a conventional valve stem 63 usual in connection with pneumatic vehicle tires is shown as having the usual valve core 64. The attaching device 26 also carries a valve core to render the usual valve core 64 inoperative and at the same time to retain pressure in the tire and to permit an inflating nipple to be applied thereto at any time. Within the attaching device is a valve 65 adapted to close upwardly under the influence of a coil spring 66 against a seat 67. The valve carries a pin 68 projecting externally for receiving the bar of the usual inflating nipple which acts to depress and open the valve 65 to admit pressure into the interior of the fitting 26 and thence into the conventional valve stem 63 through the open valve core 64. A pin, bar or other member 69 carried in the fitting 26 is adapted, when such fitting 26 is threaded upon the conventional valve stem housing 63, to encounter the usual valve pin 70 and depress the same for the purpose of opening the usual valve core 64 to enable pressure internally in the tire to spread into the fitting 26, hose 25 and to the sending instrument. During this time the valve 65 in the fitting will remain closed to prevent the escape of the air to the atmosphere. This valve 65 will at any time permit the tire to be inflated through the usual nipple connection of an air hose at a service station to the recommended tire pressure.

Referring more particularly to Figures 7 and 8, the invention is herein shown applicable to a dual wheel rear truck, trailer or bus tire and wheel mounting wherein the two tires are designated at 71 and 72 having the conventional inner tubes 73 and 74 and carried by the disc or other wheel bodies 75 and 76. The axle is indicated at 77, the rotary brake drum at 78 and the non-rotatable backing plate at 79, or spider.

One sending unit is necessary for each tire and two sending units are shown in Figure 7 as being carried by the wheel bodies 75 and 76 respectively as by the use of clamps 80 and 81. The electric transmitting cables 58 and 58ᵃ are brought centrally to binding posts 82 and 83, as shown in Figure 7, and are inserted in the holes 127 drilled through the wheel 75 and the brake drum attaching bolts 128 and are insulated therefrom in the usual manner. It is well known in the art that there are normally six to twelve attaching bolts 128 through the wheel hub having nuts 129 on each end. By removing the nuts 129 from the inside end of these bolts the brake drum 78 can be removed from the hub. By removing the nuts 129 from the outside end of these bolts 128 the wheels 75 and 76 can be removed from the hub. One of the bolts is drilled for the front wheel application and two of the bolts on opposite sides of the hub for rear wheel application. The binding posts 82 and 83 will then be inserted as described above and will extend through into the brake drum far enough to allow securing of the rings 84 and 85 to the binding posts 82 and 83 respectively. Stationary brushes 86 and 87 bear against these collector rings and are carried by the insulated bushings 88 and 89 on the stationary backing plate 79. The brushes are electrically connected with the electrical leads 90 and 91 which are shown in the circuit diagram as extending to the receiver.

Referring more particularly to Figure 9, the front stationary axle 92 of the truck or other vehicle carries the usual steering knuckle 93 on the upright steering pin 94. The knuckle carries the usual stub axle 95 upon which the wheel hub 96 is rotatably mounted. The wheel body is indicated generally at 97, the tire having been removed. The cable 58$^b$ from the sender unit, not shown in this figure, is connected to a binding post 98 which is insulated from and supported by the wheel and brake drum attaching bolt 99. An insulating plate 100 carried by the wheel hub 96 carries the collector ring 101. A brush 102 wipes against the collector ring 101 and is carried by a metallic rod 103 which is supported from the steering knuckle 93. This rod 103 electrically connects the brush with the lead 104 to the receiver.

Referring more particularly to Figure 6, a form of instrument panel 105 is shown having a single central instrument 106 of any particular type such as for instance having an index adapted to be deflected over a dial gauge plate.

The panel also carries a plurality of three-position indicating switches. One switch will suffice for two tires. Four such switches 107, 108, 109 and 110 are shown in Figure 6. In Figure 4 three such switches 107, 108 and 109 are shown but it will be understood that the number of switches will depend upon the number of tires on the auto, bus or tractor and its trailer. For instance some of the modern trucks have as many as twenty-four wheels and tires and in such case as many as twelve switches might be required. On account of the numerous tires employed on modern trucks it is not feasible to employ separate indicating gauges 106 for each tire as such plurality of gauges would be prohibitive on account of the lack of dash or instrument panel space in the modern truck cab and moreover such great number of gauges would unduly complicate the matter of testing the tire pressures. Consequently a single gauge is employed in a circuit arrangement in which individual switches are adapted to close circuit through the individual sending units of each tire, all of such sending units being adapted to sequentially impress their impulses on the single gauge. The various switches with respect to their positions may show on the dash or instrument board to what tire they are connected so that by closing that switch the vehicle operator may be apprized of the precise pressure obtaining in that tire at any particular time.

Such circuit arrangement is shown in Figure 4 in which the switches 107, 108, 109 are of the usual type being maintained in a central intermediate open position by spring bias and being closable by either moving the same up or by moving the same down. When the same are moved upwardly they will close one circuit through one particular tire sending unit and when moved down they will close a circuit through another tire sending unit.

All the switch circuits are therefore in parallel and all the circuits are connected to the instrument meter 106 through a modified Wheatstone bridge 111. The modified Wheatstone bridge has three legs 112, 113 and 114 and the effective fourth leg of the bridge is the variable resistor 45 and sending unit.

In order to change the resistance due to various lengths of wire used to connect sender units on wheels of various distances from the receiving unit, it is necessary to insert a variable resistor or potentiometer 45 in each circuit between the sending unit and the receiving unit. This potentiometer 45 will be used at the time of installing the mechanism on the vehicle to compensate for the varying resistances in the circuits so that the single meter 106 will read the correct pressure for all wheels. This potentiometer 45 will also be used during the life of the mechanism to compensate for any varying in the resistances in the various circuits, such as change of resistance between the rings 84 and 85 and the brushes 86 and 87 in the brake drum, or the change of resistance in the circuit in the event a wire becomes broken and a portion of it is removed in making a repair.

The purpose of the switch 115 and the arrangement of the circuit thereabout is to provide a means for adjusting the voltage in the entire circuit before attempting to determine pressure in any tire. This is necessary so that the same accurate reading will be obtained day after day as long as the mechanism is in service. When closing the switch 115 against the spring loading in the downward position, the current flow is through resistor 117, resistor 112, resistor 131 above the meter 106, the meter 106 and resistor 113 to the ground. The value of the resistor 124 has been so chosen that by adjusting resistor 117 to give a full scale deflection on the hand of the meter 106 a predetermined established voltage will be impressed between the end of jumper 116 and the ground, with switch 115 in its normal position and any one of the switches 107, 108 and 109 in a position to read tire air pressure on the meter 106. The switch 115 is spring loaded to normally return to a position connecting jumper 116 into the circuit to the switches 107, 108 and 109, and also to connect resistance 112 and 114 in series to make up two legs of the modified Wheatstone bridge.

When it is desired to set the meter 106 at its initial zero setting, this may be accomplished by adjusting the variable resistor 117. The vehicle battery is indicated at 118, the same being grounded as usual at one side to the vehicle chassis. The ignition switch is shown at 119 and the conventional fuse at 120. Preferably included in the circuit is a thermal overload circuit breaker 121, the same being in series with the relay 122. Also connected with the relay and in parallel with all wheel sending units there is preferably a buzzer 123 or any other form of visual or audible signal.

In operation, each of the sending units, shown in Figures 1–3, is in open communication with its respective tire so that the pressure of that tire at all times is effective against the lower plunger head 31. The pressure of the spring 40 is adjusted as to load whereby the recommended tire pressure will normally move the pressure receiving head 31, plunger 30 and plunger head 36 to a position with the flange 35 away from the diaphragm 34. In other words the spring 40 will be compressed upwardly from the position shown in Figure 2; the brush arm 40 will also be raised so as to break contact between the screw 51 and the spring disc 52. In other words the brush will be at a maximum high position on the resistor 45, cutting in a maximum amount of resistance into the circuits to thereby reduce the current therein below the minimum value for actuating all relays and signals. The spring 40 in Figure 2 is adjustable by adjusting device 42 to provide the correct relation between the pressure acting on head 31 and the position of the brush 44 on the resistor 45.

In order to obtain an accurate pressure reading in all wheels it is necessary that at a given pressure in the sending unit chamber the slide 44 be in the same position for all senders, and that the travel of the plunger 31 should always exceed that travel obtainable by the given pressure in a said tire. Since spring 40 works against this pressure in chamber 21, the adjusting mechanism 42 is used to predetermine the extent of rise of plunger 31 for a given vehicle tire set up. Example: For tires at 75-pound pressure the adjustment 42 would be so set that the maximum travel of plunger 31 would be reached with 80 or 95-pound pressure, thus allowing the 75-pound pressure to float the plunger 31 at all times. The adjustment 51 which contacts spring disc 52, located on top of spring 53, is adjustable for the purpose of grounding the disc 52 with the arm 44. This adjustment is predetermined for the value at which it is desired to set off the audible or visual signal.

This condition in all sending units will prevail as long as the pressure in all of the tires remains at the recommended value, for instance, 75-pound pressure may be used in truck tires regardless of their tonnage or whether they are hooked to trailers or not. However as soon as any of the tires falls below the recommended pressure or falls below a value for which the sending unit has been adjusted, as just described, the spring 40 will expand driving downward the cup 39 and the brush arm 44 thereby correspondingly decreasing the resistance in the circuit until such resistance is reduced to a minimum value or entirely shunted out by the contact of the threaded screw 51 against the spring disc 52 at which time all resistance will be shunted out of the circuit and full battery voltage applied to the relay and signal circuit. When this occurs the relay 122 is energized thereby closing the circuit through the thermal circuit breaker 121 and through the buzzer or other audible or visual signal 123. The thermal elements of the circuit breaker 121 will be heated due to the continuous passage of the large amount of current through the circuit thereby breaking and making the circuit causing intermittent impulses to be impressed upon the buzzer or other signal 123. This buzzer or signal initially attracts the attention of the vehicle operator to the fact that one or more of the tires has fallen below normal operating pressure and that it is approaching a dangerous operating condition. The operator will thereupon sequentially close the various switches 107, etc., at the same time observing the gauge 106 for any deviations from normal. In this way by process of elimination the operator will learn of the offending tire. The tire may then be removed and a spare put in place or the tire otherwise given attention and reinflated to proper operating pressure.

While it is not entirely essential to employ a thermal or any other circuit breaker such as the circuit breaker 121, the omission of which would provide continuous operation of the buzzer 123, it is highly desirable to employ such circuit breaker for the purpose of securing intermittent operation of the buzzer 123 to avoid annoyance of such continuous operation to the occupants of the truck cab.

A further purpose of this thermal circuit breaker is better understood when it is taken into consideration that large trucks may carry various cargoes which will set up different sonic vibrations at various speeds of the vehicle. Such noises may reach the same harmonic value as the buzzer and if the buzzer were of a continuous tone would blend therewith unknown to the operator. However the intermittent operation will cause a break in the acoustical perception to the hearer and thereby attract attention to the same.

Another purpose for employing a thermal circuit breaker is that when the tire strikes an irregular surface of the road there will be a mechanical vibration or shock to the wheel and the unit mounted on the wheel which may cause the sender to improperly close the circuit momentarily and cause operation of the relay and signals. Once the relay has been energized it will remain closed until the thermal circuit breaker opens the circuit due to the excessive amount of current passing therethrough and will de-energize the relay coil, allowing the point to open, thereby restoring the system to normal.

It will be noted from Figure 1 that the lower end of the resistor coil 45 is connected by lead 45$^a$ to the same binding post 54 to which the lower end of the coil spring 53 is attached. Thus as the brush 44 wipes downwardly over the resistor 45 it will only very gradually cut this resistance out of the circuit. However when the brush 44 arrives at a position where its screw 51 contacts the spring disc 52, all of the resistance between the brush 45 and the lead 45$^a$ will be instantly shunted out through the spring 53 which is of a lesser resistance value than the remaining coils of the resistor 45. Thus a short circuit path is provided for the current having a minimum of resistance to flow between the battery and the relay thereby making available to the relay a maximum amount of electrical energy for relay operation.

Referring more particularly to Figure 6, in the panel 105 may be included a resistor adjusting knob 125 for the variable resistor 117. Adjacent the resistor adjusting knob 125 of the panel 105 and on the other side of the meter 106 is a visual signal lamp 126 which may be connected in parallel with the buzzer and which will blink intermittently as the buzzer is sounded. The use of the lamp in conjunction with the buzzer is highly advantageous in that under normal conditions of night driving the driver tries to keep the cab as dark as possible in order that all objects in the road will stand out over a dark background. The continuous blinking of this light in the darkness will readily attract the eye of the operator. If due to the conditions set forth previously of harmonic interferences with the perception of the buzzer, the operator is thereby advised of pending trouble.

The switch 115 is in the circuit for the purpose of obtaining a balanced voltage of equal value each time it is desired to check air pressure in the various tires. As hereinbefore set forth, resistors 45 are in the circuit for the purpose of obtaining equal resistances in all circuits between the sending unit and the receiving unit at the time of the installation of the mechanism on a motor vehicle, or the compensating for change in resistance in these various circuits throughout the life of the mechanism. Under normal operation and except for purposes of maintenance the resistors 45 will not be touched and will be so installed in the receiving unit as to be out of the way when the vehicle operator checks the air pressure of the tires of that particular vehicle. A further explanation of switch 115 might be stated thus, that this balancing of the circuit only takes place once during the procedure of checking pressure in all the tires on a vehicle, the purpose being to start the checking procedure each time with the predetermined selected voltage in order that readings obtained each day will be of the same accuracy.

While it has been disclosed herein that the sender units have been mounted in a non-radial manner with respect to the wheels, this is not critical for the proper operation of the unit. The unit is so constructed that centrifugal forces have no effect on it regardless of the position in which it is mounted.

While we have disclosed herein the best form of the invention known to us at the present time, we desire it to be understood that we reserve the right to make changes and modifications in the herein described embodiment of the invention provided such changes fall within the scope of the following claims.

What we claim is:

1. For use with a remote pressure indicator and safety alarm for pneumatic tired vehicles, a low pressure impulse signalling device comprising a pressure transmitting body, a platform carried by said body, the lower portion of said body constituting a bearing guide, a pressure chamber beneath said body, a pressurestat within said chamber, a diaphragm between said pressure chamber and said body, a plunger rod receivable through said bearing guide and being connected with said pressurestat, a plunger head on the other end of said plunger rod, an annular cup carried by said plunger head and movable therewith, spring means for adjusting said cup and plunger to counteract said pressurestat, a resistor carried by said platform, a brush arm carried by said cup at a point on its periphery and arranged to electrically wipe across said resistor, adjustable means carried by said platform and brush arm for shunting out the resistor from the external circuit when the brush reaches a predetermined position on said resistor which movement is controlled by said pressurestat, and a transmitting terminal for connecting said signalling device to an external circuit thereby placing the resistance governed by said pressurestat in the external circuit.

2. A signalling device as claimed in claim 1 characterized by the fact that said spring means for adjusting said cup and plunger to counteract said pressurestat is a helical spring one end of which is seated in said cup and the other end of which abuts and is movable with an adjustable abutment carried by said pressure transmitting body in the upper portion thereof.

3. A signalling device as claimed in claim 1 wherein said adjustable means for shunting out the resistor from the external circuit when the brush reaches a predetermined position on said resistor comprises a substantially horizontally projecting lug carried by said brush and having a threadedly adjustable screw therethrough positioned to engage a jumper carried by said platform.

CLARENCE POE POTTS.
STEPHEN EDWARD ELLERBE.
ROLAND AVERY HALL.

REFERENCES CITED

The following references are of record in the file of this patent:

UNITED STATES PATENTS

| Number | Name | Date |
|---|---|---|
| 1,581,320 | Pumphrey | Apr. 20, 1926 |
| 1,761,130 | Kennedy | June 3, 1930 |
| 1,851,978 | Dinger | Apr. 5, 1932 |
| 2,033,424 | Gieskieng | Mar. 10, 1936 |
| 2,235,930 | Huggins | Mar. 25, 1941 |
| 2,248,047 | Addy et al. | July 8, 1941 |
| 2,279,140 | Kellen | Apr. 7, 1942 |
| 2,423,609 | Middleton et al. | July 8, 1947 |